Oct. 23, 1934.    H. H. FEBREY    1,977,846
BUTT WELDED END FITTING
Filed Nov. 6, 1931
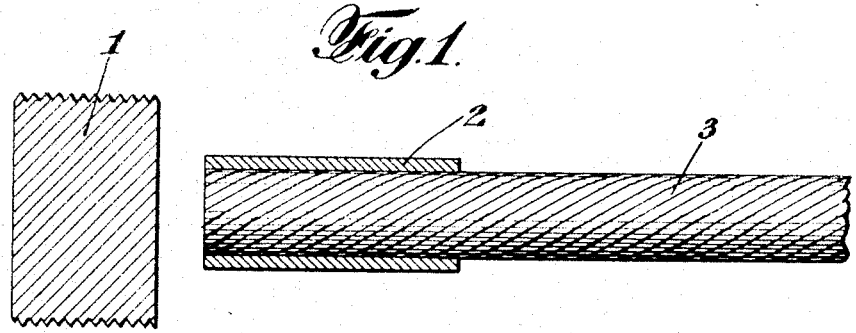
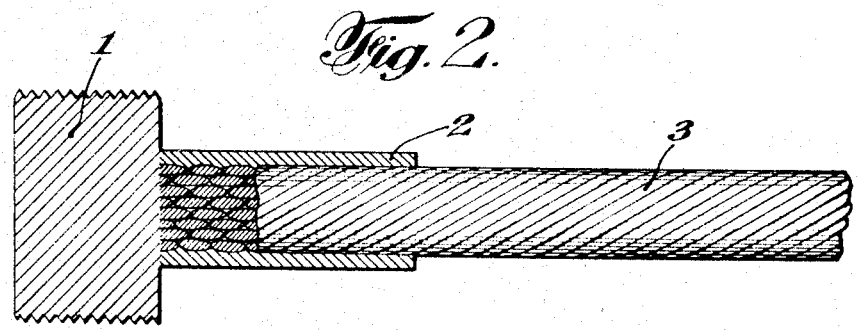
INVENTOR
Harold H. Febrey
BY
ATTORNEYS Patented Oct. 23, 1934

1,977,846

UNITED STATES PATENT OFFICE 1,977,846

BUTT WELDED END FITTING

Harold H. Febrey, South Orange, N. J., assignor to American Steel and Wire Company, New York, N. Y., a corporation of New Jersey Application November 6, 1931, Serial No. 573,468

2 Claims. (Cl. 29—148)

This invention relates to cable end fittings and to a method of uniting the same to a cable end.

One of the objects of the present invention is to provide means to improve the tensile strength of a welded assembly including a cable and a cable end fitting.

Another object of the present invention is to provide an improved method of attaching end fittings to a wire cable.

Other objects and advantages will become apparent as the invention is more fully disclosed.

In accordance with the objects of the present invention I have devised an improved method of attaching end fittings to a cable end wherein the fitting and cable ends are butt welded together and means are provided to make the tensile strength of the welded assembly approximately equal to that of the wire cable before welding.

Before further disclosing the nature and scope of the present invention reference should be made to the accompanying drawing wherein:

Fig. 1 is a side elevational view partly in section of the elements comprising the cable end fitting assembly of the present invention before welding.

Fig. 2 is the same view after welding.

Referring to the drawing, the elements of the present invention comprise a cable end fitting member 1 which may for example be a threaded stud bolt adapted to be engaged with a turnbuckle, but which may be of course of any other desired shape, configuration or metallic composition; and a sleeve member 2 adapted to be placed about the end of cable 3 and frictionally engaged therewith. Elements 1, 2 and 3 are comprised of such materials as are suitable for the purposes of the present invention.

Heretofore in the art cable ends have been welded to end fitting members, and have also been butt welded to objects other than typical cable end fittings. Such welded unions, however, have not been adapted for use under tensional service conditions due to the fact that the heat energy applied to the parts during the welding operation deleteriously affects the tensile strength of the materials and in particular the tensile strength of the stranded cables in which relatively high or a preferred tensile strength has been developed by cold work or by suitable heat treatment.

When a cable end in which a desired tensile strength has been developed is butt welded to an end fitting member, the deleterious effect of the heating on the tensile strength of the cable is reduced somewhat over other types of welding. In some types of butt welding such as the flash butt weld a welded union of relatively high tensile strength may be obtained but in general there is always a marked decrease in tensile strength from that of the cable originally. In some instances and with some types of cables, such as plow steel cable, there may be as much as a 40% reduction in tensile strength in the metal of the cable adjacent the weld. The loss of tensile strength, however, is dependent upon the particular welding conditions and the material comprising the welded union.

I have found that I may eliminate or overcome this deleterious effect upon the tensile strength of the wire cable by applying a sleeve member to the cable end and frictionally engaging the same to the cable surface, as by swaging, or compressing the same thereon to such an extent that the frictional engagement compensates for or approximately equals the loss in tensile strength in the weld operation and thereafter butt welding the sleeve and cable end to the end fitting.

By the use of the sleeve member also butt welded to the end fitting, the strands of the cable are protected from being angularly displaced from their normal position during the welding operation; thus increasing the tensile strength at the weld. The sleeve member also serves to carry away the bulk of the welding heat; thus minimizing the annealing effect of the welding heat. The sleeve member also facilitates the welding by increasing the conductivity of the abutting parts. By frictionally engaging the sleeve to the cable surface the tensile strength of the entire welded assembly can be adjusted to approximately compensate for the loss in tensional strength occasioned by the welding heat. This loss in tensional strength at the weld union will vary widely depending upon the welding conditions, composition of materials comprising the end fitting cable and sleeve member, and with sizes thereof and their relative proportions, and other factors. The extent of frictional engagement may be varied however accordingly.

It is apparent, therefore, that there may be many modifications made in the specific embodiment herein disclosed and illustrated in the drawing without departing essentially from the nature and scope thereof as may be set forth in the following claims:—

What I claim is:

1. The method of attaching an end fitting to a cable end which comprises enclosing the cable end in a sleeve member, frictionally engaging the inner surface of the sleeve member with the surface of the cable end and thereafter butt welding the cable and sleeve ends to the end fitting, the extent of said frictional engagement of sleeve and cable surfaces being approximately sufficient to offset the loss in tensional strength in the cable as a result of the welding operation.

2. In combination, a cable, a sleeve member enclosing and frictionally engaging the cable end, and an end fitting member butt welded to the end of the cable and sleeve member.

HAROLD H. FEBREY.